Figure 1:
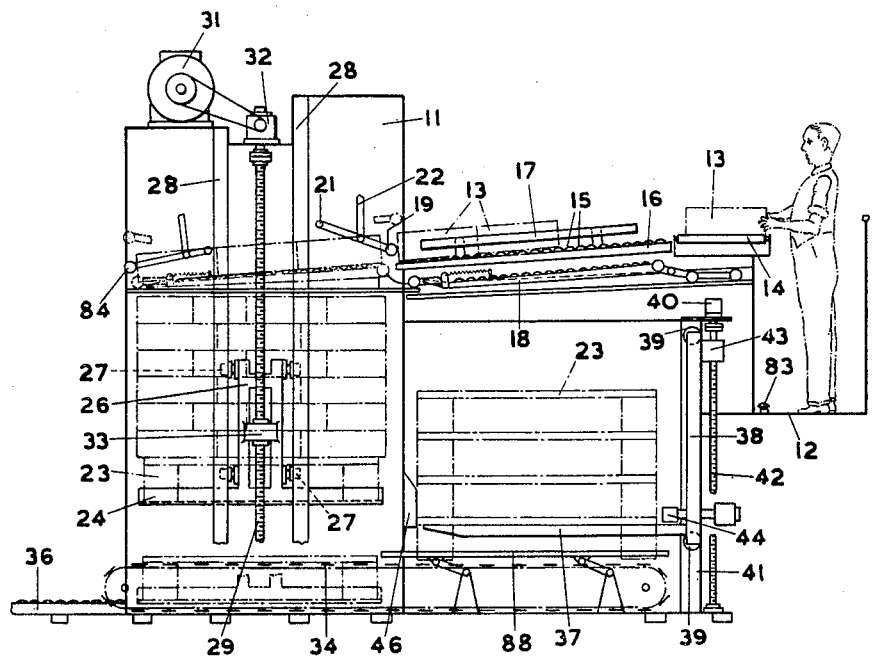

July 28, 1964   W. N. BOLT   3,142,389
PALLET LOADING MECHANISMS
Filed Feb. 21, 1962   3 Sheets-Sheet 1

July 28, 1964  W. N. BOLT  3,142,389
PALLET LOADING MECHANISMS
Filed Feb. 21, 1962  3 Sheets-Sheet 3

United States Patent Office 3,142,389
Patented July 28, 1964

3,142,389
PALLET LOADING MECHANISMS
William Noel Bolt, Holly House Farm, Great Sankey,
Warrington, Lancashire, England
Filed Feb. 21, 1962, Ser. No. 174,907
4 Claims. (Cl. 214—6)

This invention relates to pallet loading mechanisms of the kind in which articles, e.g., packages, cases or crates, are arranged in successive layers on a loading platform from which each layer is transferred, as it is completed, on to a pallet, one layer on top of another, supported on a vertically movable carriage, the latter being lowered (from an elevated original position adjacent the loading platform) a distance equal to the height of a layer of articles after each layer is transferred, so that the upper surface of the layer lies in the plane originally occupied by the upper surface of the pallet, the transferring operations proceeding until the required number of layers are stacked on the pallet to complete a unit load. The term "pallet" as used herein is intended to mean a portable load-supporting platform of the kind now commonly used in association with load-carrying vehicles of the kind known as "fork-lift trucks." The loading platform usually consists of a frame containing a number of freely mounted rollers, the frame being inclined slightly downwardly towards the waiting pallet to act as a gravity conveyor. A movable stop is provided to limit the free movement of the articles along the platform and is controlled, e.g., pneumatically, by the operator arranging the articles on the platform, the stop being lifted to release each layer as it is completed. A further movable stop is provided to prevent over-running of the articles beyond the pallet, that stop being lifted (to allow the unit load to be moved forwardly) automatically by the movable carriage as it reaches its lowermost position upon positioning of the last layer of articles to complete the unit load. The construction and operation of the above kind of mechanism (referred to hereinafter as the "kind described") is well known, the movements of the various members being co-ordinated by controlling mechanism, e.g., electrical or pneumatic mechanism, or both, a cycle of operations being commenced by actuation of a controlling switch or valve by the operator upon completion of the arrangement of a layer of articles on the loading platform. As the pallet carriage reaches its lowermost position, the loaded pallet is transferred to a delivery conveyor (from which it may be moved by a fork-lift truck) and a further pallet is withdrawn from a magazine and moved into position on the carriage to allow a further loading operation to commence.

It is with the construction and operation of the pallet magazine that the present invention is concerned.

According to the present invention, there is provided a mechanism of the kind described, wherein the pallet magazine comprises a vertically movable base arranged above a conveyor and adapted to support a stack of pallets, a clamping device adapted to move into clamping engagement with the pallet next to the bottom one of the stack so as to support all but the bottom pallet, and means for operating the movable base, while the stack is so supported by the clamping device, firstly to lower the bottom pallet on to the conveyor and then, after the pallet has been moved by the conveyor, to raise the base into engagement with the bottom of the stack, the clamping device then being released to leave the stack supported on the base.

The movable base is conveniently lifted and lowered by means of a screw jack operated by a motor with appropriate reduction gear, which is switched in and out in timed relationship with the movements of the pallet carriage and the pallet conveyor. The clamping device, which is similarly operated in timed relationship with the movements of the base and the conveyor, may consist of a pair of plungers housed in cylinders to the ends of which fluid under pressure is admitted to thrust the plungers into engagement with the appropriate pallet in the stack.

The conveyor over which the magazine is arranged preferably moves in a common plane with the delivery conveyor with which it is driven synchronously, there being, conveniently, a common conveyor passing below both the magazine and the pallet carriage.

With such construction, the various mechanisms may be so timed that a pallet is delivered from the magazine on to the conveyor during the latter stages of the movement of the pallet carriage so that, as the conveyor is started, e.g., as the carriage comes to rest below the surface of the conveyor, the loaded pallet is driven away from the carriage simultaneously with the movement of an empty pallet into register with the carriage for movement by the carriage into the loading position.

Figure 2:
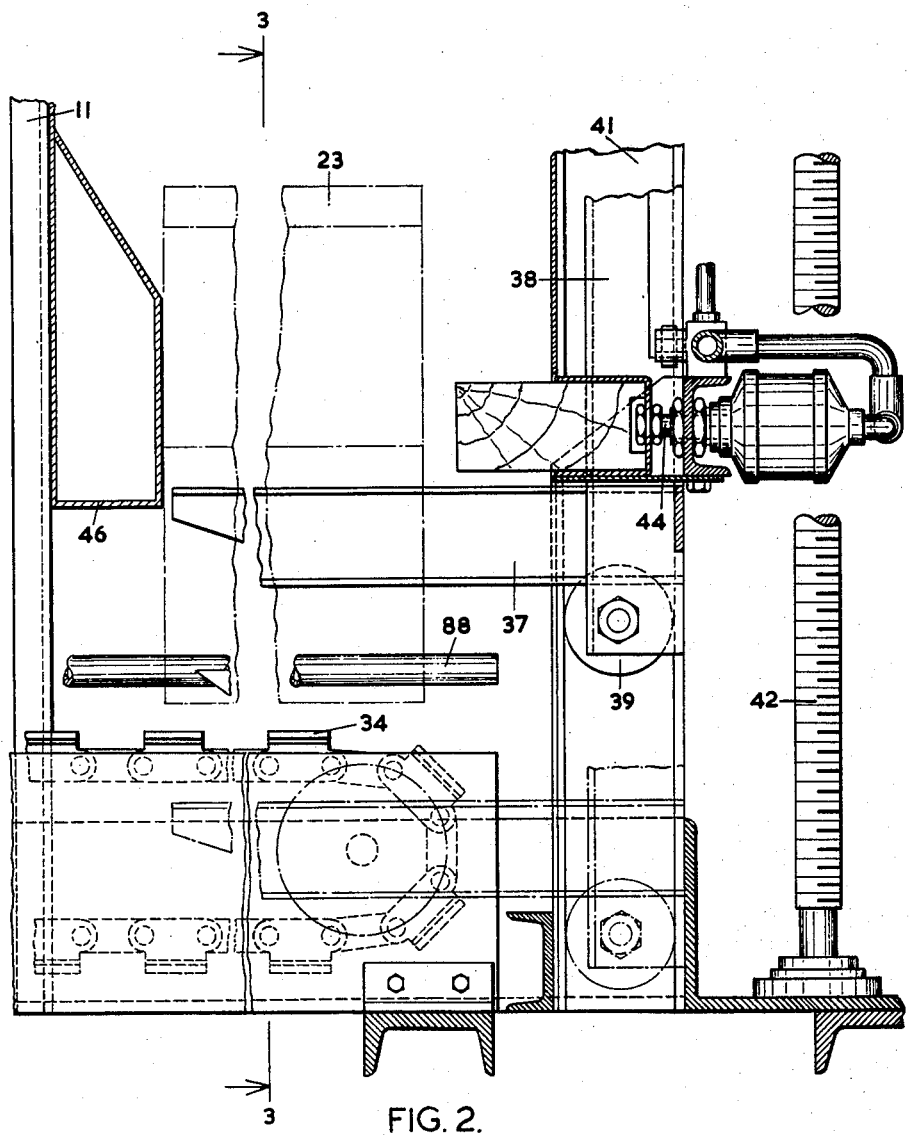
Figure 3:
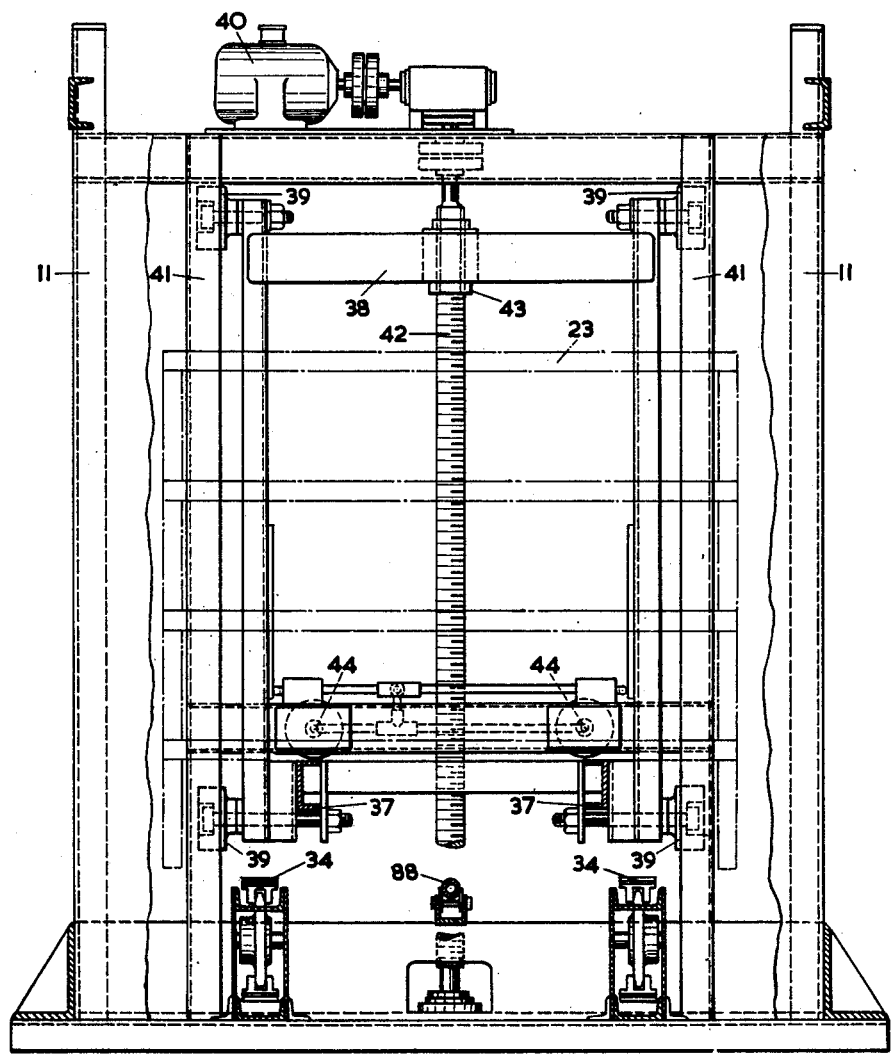

The invention will now be described in greater detail with reference to the accompanying drawings, in which FIGURE 1 is a diagram illustrating the essential elements of the machine, FIGURE 2 is a sectional elevation of part of the machine shown in FIGURE 1, drawn to a larger scale, and FIGURE 3 is an end view of part of the machine, taken on the line 3—3 in FIGURE 2.

Briefly describing the essential elements of the machine, a fabricated framework 11 supports a platform 12 at a height convenient for the manhandling of articles 13 (shown in this example as cartons) from a feed conveyor 14 on to a downwardly inclined loading platform 16 consisting of a series of freely mounted rollers 15 in layers between side guides 17. Arranged below the loading platform 16 is a stripping plate 18 movable to the position indicated in chain-dotted lines in FIGURE 1 to receive a layer of cartons 13 from the loading platform 16 upon lifting of a movable end stop bar 19, pivoted at 21 and operable by a link 22, the bar extending across the width of the platform 16. In the forward position, the plate 18 is immediately over a pallet 23 (or a previously formed layer of cartons 13 on the pallet) supported on a carriage consisting of a pair of supports 24 each extending from a trolley 26, mounted on rollers 27 movable in vertical tracks 28, the trolleys 26 being actuated by screws 29 driven by a motor 31 through reduction gears 32, the screws 29 engaging nut members 33 in the trolleys 26.

Running the length of the machine is a main conveyor 34 arranged to receive each loaded pallet 23 and pass it forward to a delivery conveyor 36. The conveyor 34 passes under a stack of pallets 23 supported on a pair of extensions 37 from a trolley 38 mounted on rollers 39 arranged to run in tracks 41, and operable by a rotatable screw 42 engaging a nut member 43 in the trolley 38, the screw being driven by a motor 40 fitted with appropriate reduction gear, the extensions 37 thus constituting a vertically movable base. The lowermost pallet 23 is lowered on to the conveyor 34 while the rest of the stack is supported by a clamping device consisting of a pair of pneumatically operated plungers 44 arranged to engage the pallet 23 next to the lowermost one and thrust it against an abutment 46.

In operation, an operator standing on the platform 12 slides cartons 13 from the conveyor 14 on to the loading platform and arranges them in an orderly layer with the forward cartons 13 abutting the stop 19. As each layer is completed, the operator presses a foot switch 83 which starts an automatic sequence of operations. The stop 19 lifts to clear the forward edge of the layer, thus freeing that layer for forward movement under gravity on to the stripping plate 18, which at this stage is in the forward position, shown in chain-dotted lines in FIGURE 1, the extent of the forward movement of the layer being determined by a movable stop bar 84 extending across the width of the machine.

As the forward cartons 13 of the layer reach the stop 84 a switch is operated to cause the stripping plate 18 to be retracted below the loading platform 16. As retraction of the plate continues, the layer is stripped off the plate 18 by the stop bar 19 (which has returned in the meantime to its lowermost position) and passes smoothly on to the pallet 23.

As the plate 18 reaches its fully retracted position, a switch is actuated to cause the carriage 26 to move downwardly a distance equal to the height of a layer of cartons 13 so that the upper surface of the layer on the pallet 23 now lies in the plane originally occupied by the upper surface of the pallet. As the carriage 26 reaches its new position, a switch operates to stop the motor 31 and also to cause the plate 18 to be moved forward. The cycle is then repeated until the pallet 23 is fully loaded and the carriage 26 reaches its lowermost position. As this position is reached a switch is tripped to cause movement of the conveyor 34 and at the same time to lift the stop bar 84 to allow the loaded pallet to be moved forward by the conveyor 34 on to the delivery conveyor 36, such movement also bringing forward an empty pallet 23 previously lowered on to the conveyor 34 by the extensions 37 in the manner described above in response to the tripping of a switch by the carriage 26 as it approaches its lowermost position, the switch causing operation of the screw 42. The extent of the lowering movement is determined by a limit switch.

The lowermost pallet 23 lowered on to the conveyor 34 from the stack in this manner engages a spring-loaded bar 88 which causes partial completion of the circuit of the motor driving the conveyor 34, the circuit being completed by the switch operated by the carriage 26, as explained above, to cause operation of the conveyor 34. As the empty pallet passes off the end of the bar 88 into position above the carriage 26, the bar 88 springs upwardly to break the circuit of the motor driving the conveyor 34 and at the same time switch in the motor 31 to raise the carriage 26 with the empty pallet 23 into the loading position determined by a limit switch, the stripping plate 18 having returned in the meantime to the foremost position in readiness to receive the next layer of cartons 13. The springing up of the bar 88 also causes operation of the screw 42 to cause upward movement of the extensions 37 until they reach the pallet 23 held by the plungers 44, at which position a valve is operated to release the plungers and thus allow the stack of pallets to rest on the extensions 37. The complete loading cycle is then repeated to provide another unit load.

I claim:

1. In a pallet loading mechanism of the kind described, the combination of an article-feeding conveyor, a loading platform arranged transversely of the direction of movement of the articles on the article feeding conveyor and downwardly inclined away therefrom, a movable end stop arranged at the forward end of the platform and being responsive to a controlling means operable at will by an operator, a pallet carriage arranged forwardly of the loading platform with respect to the direction of movement of the articles on the platform for receiving a layer of articles from the platform, said carriage being movable vertically to deposit a loaded pallet on to a delivery conveyor, a pallet-feeding conveyor for transporting an empty pallet into position above the pallet carriage when the carriage is in its lowermost position, the movement of the pallet-feeding conveyor being responsive to a conveyor control member operable by the carriage as it reaches its lowermost position, a pallet magazine having a vertically movable base arranged above the pallet-feeding conveyor and adapted to support a stack of pallets, a clamping device arranged, prior to the operation of the conveyor control member by the carriage, to move into clamping engagement with the pallet next to the bottom one of the stack so as to support all but the bottom pallet, and means for operating the movable base, while the stack is so supported by the clamping device, firstly to lower the bottom pallet on to the pallet-feeding conveyor and then, after the pallet has been moved by the pallet-feeding conveyor, to raise the base into engagement with the lowermost pallet in the stack, the clamping device then being released to leave the stack supported on the base.

2. In a pallet-loading mechanism of the kind described, the combination of an article-feeding conveyor, a loading platform arranged transversely of the direction of movement of the articles on the article feeding conveyor and downwardly inclined away therefrom, a movable end stop arranged at the forward end of the platform and being responsive to a controlling means operable at will by an operator, a pallet carriage arranged forwardly of the loading platform with respect to the direction of movement of the articles on the platform for receiving a layer of articles from the platform, said carriage being movable vertically to deposit a loaded pallet on to a delivery conveyor, a pallet-feeding conveyor for transporting an empty pallet into position above the pallet carriage when the carriage is in its lowermost position, the movement of the pallet-feeding conveyor being responsive to a conveyor control member operable by the carriage as it reaches its lowermost position, a pallet magazine having a vertically movable base arranged above the pallet-feeding conveyor and adapted to support a stack of pallets, a clamping device arranged, prior to the operation of the conveyor control member by the carriage, to move into clamping engagement with the pallet next to the bottom one of the stack so as to support all but the bottom pallet, a screw jack for operating the movable base in timed relationship with the movement of the pallet-feeding conveyor, while the stack is so supported by the clamping device, firstly to lower the bottom pallet on to the pallet-feeding conveyor and then, after the pallet has been moved by the pallet- feeding conveyor, to raise the base into engagement with the lowermost pallet in the stack, the clamping device then being released to leave the stack supported on the base.

3. In a pallet loading mechanism of the kind described, the combination of an article-feeding conveyor, a loading platform arranged transversely of the direction of movement of the articles on the article feeding conveyor and downwardly inclined away therefrom, a movable end stop arranged at the forward end of the platform and being responsive to a controlling means operable at will by an operator, a pallet carriage arranged forwardly of the loading platform with respect to the direction of movement of the articles on the platform for receiving a layer of articles from the platform, said carriage being movable vertically to deposit a loaded pallet on to a delivery conveyor, a pallet feeding conveyor constituted by a continuation of the delivery conveyor for transporting an empty pallet into position above the pallet carriage when the carriage is in its lowermost position, the movement of the pallet-feeding conveyor being responsive to a conveyor control member operable by the carriage as it reaches its lowermost position, a pallet magazine having a vertically movable base arranged above the pallet-feeding conveyor and adapted to support a stack of pallets, a clamping device arranged, prior to the operation of the conveyor control member by the carriage, to move into clamping engagement with the pallet next to the bottom one of the stack so as to support all but the bottom pallet, and means for operating the movable base, while the stack is so supported by the clamping device, firstly to lower the bottom pallet on to the pallet-feeding conveyor and then, after the pallet has been moved by the pallet-feeding conveyor, to raise the base into engagement with the lowermost pallet in the stack, the clamping device then being released to leave the stack supported on the base.

4. In a pallet loading mechanism of the kind described, the combination of an article-feeding conveyor, a loading platform arranged transversely of the direction of movement of the articles on the article feeding conveyor and downwardly inclined away therefrom, a movable end stop arranged at the forward end of the platform and being responsive to a controlling means operable at will by an operator, a pallet carriage arranged forwardly of the loading platform with respect to the direction of movement of the articles on the platform for receiving a layer of articles from the platform, said carriage being movable vertically to deposit a loaded pallet on to a delivery conveyor, a pallet-feeding conveyor for transporting an empty pallet into position above the pallet carriage when the carriage is in its lowermost position, the movement of the pallet-feeding conveyor being responsive to a conveyor control member operable by the carriage as it reaches its lowermost position, a pallet magazine having a vertically movable base arranged above the pallet feeding conveyor and adapted to support a stack of pallets, a pneumatic clamping device arranged, prior to the operation of the conveyor control member by the carriage, to move into clamping engagement with the pallet next to the bottom one of the stack so as to support all but the bottom pallet, and means for operating the movable base, while the stack is so supported by the clamping device, firstly to lower the bottom pallet on to the pallet-feeding conveyor and then, after the pallet has been moved by the pallet-feeding conveyor, to raise the base into engagement with the lowermost pallet in the stack, the clamping device then being released by valve means to leave the stack supported on the base.

References Cited in the file of this patent

UNITED STATES PATENTS

| 2,613,824 | Tallman | Oct. 14, 1952 |
| 2,710,650 | Stevenson | Feb. 8, 1955 |
| 2,789,704 | Lewin | Apr. 23, 1957 |
| 2,815,874 | Kowal | Dec. 10, 1957 |
| 2,946,465 | Raynor | July 26, 1960 |

FOREIGN PATENTS

| 881,284 | Great Britain | Nov. 1, 1961 |
| 881,285 | Great Britain | Nov. 1, 1961 |